United States Patent
Habibvand et al.

(10) Patent No.: US 10,012,265 B2
(45) Date of Patent: *Jul. 3, 2018

(54) CORROSION RESISTANT BEARING MATERIAL

(71) Applicant: Roller Bearing Company of America, Inc., Oxford, CT (US)

(72) Inventors: Alex Habibvand, Orange, CA (US); Frederick S. Gyuricsko, Torrington, CT (US); Jay Phoenix, Bristol, CT (US); Arnold E. Fredericksen, New Hartford, CT (US); John H. Cowles, Jr., Unionville, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/728,402

(22) Filed: Jun. 2, 2015

(65) Prior Publication Data

US 2015/0260225 A1 Sep. 17, 2015

Related U.S. Application Data

(60) Continuation-in-part of application No. 13/719,541, filed on Dec. 19, 2012, which is a
(Continued)

(51) Int. Cl.
*F16C 33/36* (2006.01)
*F16C 33/62* (2006.01)
(Continued)

(52) U.S. Cl.
CPC ............... *F16C 33/36* (2013.01); *B64C 9/02* (2013.01); *B64C 9/16* (2013.01); *F16C 23/086* (2013.01);
(Continued)

(58) Field of Classification Search
CPC ........ F16C 33/36; F16C 33/784; F16C 33/48; B64C 9/22
(Continued)

(56) References Cited

U.S. PATENT DOCUMENTS

| 1,199,404 A | 9/1916 | Miller |
| 1,376,310 A | 4/1921 | Armstrong |

(Continued)

FOREIGN PATENT DOCUMENTS

| CN | 100436851 C | 11/2008 |
| DE | 2800854 A1 | 7/1978 |

(Continued)

OTHER PUBLICATIONS

Extended Search Report for EP15170500.1-1751, dated Nov. 5, 2015.
(Continued)

*Primary Examiner* — Brian M O'Hara
*Assistant Examiner* — Keith L Dixon
(74) *Attorney, Agent, or Firm* — Murtha Cullina LLP

(57) ABSTRACT

In one aspect, the present invention resides in an edge flap arrangement for an aircraft wing that has a main flap element and an actuator for moving the main flap element relative to the wing, a linkage arrangement that supports the main flap element from the aircraft wing for movement relative to the wing, the linkage arrangement including a drop link and a hinge point. The fixed strut and the drop link are pivotally connected by the hinge point. The hinge point includes a bearing. The bearing is an hourglass bearing assembly that has an inner raceway outer raceway. The outer raceway is positioned around the inner raceway. A plurality of rollers is disposed between the inner raceway and the outer raceway. The plurality of rollers, the outer raceway and/or the inner raceway are manufactured from CREN and/or CRES.

24 Claims, 4 Drawing Sheets

Related U.S. Application Data continuation-in-part of application No. 13/114,099, filed on May 24, 2011, now Pat. No. 8,387,924, which is a division of application No. 12/201,062, filed on Aug. 29, 2008, now Pat. No. 8,025,257.

(60) Provisional application No. 62/007,210, filed on Jun. 3, 2014, provisional application No. 62/090,247, filed on Dec. 10, 2014, provisional application No. 60/992,746, filed on Dec. 6, 2007.

(51) Int. Cl.
*B64C 9/02* (2006.01)
*F16C 23/08* (2006.01)
*B64C 9/16* (2006.01)
*F16C 23/04* (2006.01)
*F16C 11/06* (2006.01)

(52) U.S. Cl.
CPC .......... *F16C 33/62* (2013.01); *F16C 11/0614* (2013.01); *F16C 23/041* (2013.01); *F16C 2326/43* (2013.01)

(58) Field of Classification Search
USPC .......................................... 244/214; 384/568
See application file for complete search history.

(56) References Cited

U.S. PATENT DOCUMENTS

| | | | |
|---|---|---|---|
| 1,901,967 A | 3/1933 | Hoover | |
| 2,387,962 A | 10/1945 | Williams | |
| 2,678,246 A | 5/1954 | Potter | |
| 2,764,432 A | 9/1956 | Leister et al. | |
| 2,767,037 A | 10/1956 | Williams | |
| 3,594,851 A | 7/1971 | Swatton | |
| 4,049,219 A | 9/1977 | Dean et al. | |
| 4,557,613 A | 12/1985 | Tallain et al. | |
| 4,714,358 A | 12/1987 | Bayer et al. | |
| 4,929,098 A | 5/1990 | Takata et al. | |
| 5,310,269 A | 5/1994 | Wardle et al. | |
| 5,441,351 A * | 8/1995 | Grunze | F16C 23/086 384/450 |
| 5,586,826 A | 12/1996 | Kellstrom et al. | |
| 5,667,312 A | 9/1997 | Grunze et al. | |
| 6,315,458 B1 * | 11/2001 | Unno | F16C 19/26 384/565 |
| 6,390,685 B1 | 5/2002 | Shimomura et al. | |
| 6,394,656 B1 | 5/2002 | Williams | |
| 7,959,678 B2 | 6/2011 | Filippi et al. | |
| 8,025,257 B2 | 9/2011 | Gyuricsko et al. | |
| 8,070,106 B2 | 12/2011 | Engelbrecht et al. | |
| 8,534,612 B2 | 9/2013 | Morris | |
| 8,567,727 B2 | 10/2013 | Morris | |
| 8,714,493 B2 | 5/2014 | Morris | |
| 8,753,457 B2 | 6/2014 | Moyer | |
| 9,561,845 B2 * | 2/2017 | Habibvand | B64C 9/16 |
| 2005/0069239 A1 | 3/2005 | Yamamoto et al. | |
| 2006/0115193 A1 | 6/2006 | Begin | |
| 2008/0040886 A1 | 2/2008 | Arnold et al. | |
| 2008/0219834 A1 | 9/2008 | Merfeld et al. | |
| 2009/0169145 A1 | 7/2009 | Obayashi et al. | |
| 2010/0027933 A1 | 2/2010 | Locke et al. | |
| 2010/0033965 A1 | 2/2010 | Casey et al. | |
| 2010/0150486 A1 | 6/2010 | Kuppuraju et al. | |
| 2010/0215303 A1 | 8/2010 | Shaikh | |
| 2011/0064348 A1 | 3/2011 | Jacob et al. | |
| 2011/0086754 A1 | 4/2011 | Gentleman et al. | |
| 2011/0127386 A1 | 6/2011 | Morris | |
| 2011/0182539 A1 | 7/2011 | Kolar | |
| 2011/0220762 A1 | 9/2011 | Gyuricsko et al. | |
| 2011/0274382 A1 | 11/2011 | Berns et al. | |
| 2011/0293212 A1 | 12/2011 | Kobayashi | |
| 2011/0317952 A1 | 12/2011 | Heaton et al. | |
| 2012/0082409 A1 | 4/2012 | Miyachi | |
| 2012/0263405 A1 | 10/2012 | Mizuki et al. | |
| 2012/0291625 A1 | 11/2012 | Habibvand | |
| 2013/0087662 A1 | 4/2013 | Soenarjo | |
| 2013/0108200 A1 | 5/2013 | Berns | |
| 2013/0112814 A1 | 5/2013 | Yue | |
| 2013/0142471 A1 | 6/2013 | Muller et al. | |
| 2014/0193112 A1 | 7/2014 | Caspall | |
| 2014/0301680 A1 | 10/2014 | Tecza et al. | |
| 2014/0301689 A1 | 10/2014 | Honjo | |
| 2014/0334761 A1 | 11/2014 | Hewitt et al. | |
| 2014/0339369 A1 | 11/2014 | Habibvand | |
| 2014/0345141 A1 | 11/2014 | Gonzalez et al. | |
| 2014/0369634 A1 | 12/2014 | Kane | |
| 2015/0078699 A1 | 3/2015 | Gessendorfer et al. | |

FOREIGN PATENT DOCUMENTS

| | | |
|---|---|---|
| DE | 19612571 A1 | 10/1997 |
| DE | 102006050940 A1 | 4/2008 |
| DE | 102009042941 A1 | 3/2011 |
| EP | 0189365 A1 | 7/1986 |
| EP | 0649990 A1 | 4/1995 |
| EP | 1315914 B1 | 10/2005 |
| EP | 2354579 A2 | 8/2011 |
| EP | 2067696 B1 | 8/2013 |
| EP | 2589829 A1 | 8/2013 |
| GB | 2237336 A | 5/1991 |
| GB | 2428996 A | 2/2007 |
| JP | 2006071091 A | 3/2006 |
| JP | 2006266277 A | 5/2006 |
| JP | 2008286330 A | 11/2008 |
| JP | 2012017770 A | 1/2012 |
| JP | 2012202453 A | 10/2012 |
| JP | 2013145012 A | 7/2013 |
| JP | 2014018825 A | 2/2014 |
| WO | 2001025647 A1 | 4/2001 |
| WO | 2007074691 A1 | 7/2007 |
| WO | 2007125001 A2 | 11/2007 |
| WO | 2011140230 A1 | 11/2011 |
| WO | 2012129223 A1 | 9/2012 |
| WO | 2013122526 A1 | 8/2013 |
| WO | 20131329645 A1 | 9/2013 |
| WO | 2014021958 A1 | 2/2014 |
| WO | 2014182569 A2 | 11/2014 |
| WO | 2015031247 A2 | 3/2015 |

OTHER PUBLICATIONS

Office Communication issued in corresponding European Application No. 14198599.4, dated May 11, 2016, pp. 1-5.
Extended European Search Report for European Patent Application No. 14198599.4-1751 / 2894359, dated Jun. 17, 2015.
Extended European Search Report for European Patent Application No. 15170493.9-1760 / 2952760, dated Jan. 4, 2016.
Extended European Search Report for EP Patent Application No. 15170498.8-1760/2957781, dated Feb. 5, 2016.

* cited by examiner

CORROSION RESISTANT BEARING MATERIAL

CROSS REFERENCE TO RELATED APPLICATIONS

This patent application claims the benefit of U.S. Provisional Patent Applications Ser. No. 62/007,210, filed on Jun. 3, 2014 and Ser. No. 62/090,247, filed Dec. 10, 2014. This application is also a continuation in part of and claims priority benefit under 35 U.S.C. § 120 to co-pending U.S. patent application Ser. No. 13/719,541 filed Dec. 19, 2012 which is a continuation in part of and claims priority benefit to U.S. patent application Ser. No. 13/114,099, filed May 24, 2011, issued as U.S. Pat. No. 8,387,924 on Mar. 5, 2013 and which is a divisional application of and claims priority benefit under 35 U.S.C. § 120 to U.S. patent application Ser. No. 12/201,062, filed Aug. 29, 2008, issued as U.S. Pat. No. 8,025,257 on Sep. 27, 2011 and which is a U.S. Utility Application of U.S. Provisional Application Ser. No. 60/992,746, filed Dec. 6, 2007 and to which priority benefit under 35 U.S.C. § 119(e) is claimed, and all of which are hereby incorporated by reference in their entirety.

FIELD OF THE INVENTION

This invention relates to corrosion resistant nitrogen (CREN) bearing materials and more specifically to a bearing made from XD15NW® (XD15NW is a registered U.S. trademark of AUBERT & DUVAL COMPANY, FRANCE) (AMS 5920), Cronidur 30® (CRONIDUR is a registered U.S. trademark of Energietechnik Essen GmbH, GERMANY) (AMS 5925), 422 stainless (AMS 5655), and/or to corrosion resistant steel (CRES) bearing materials such as 440C stainless steel (ASM 5630, ASM 5618, or ASM 5880), and more particularly to a material for an hourglass bearing for use in aircraft wing end arrangements of other than a Boeing® brand aircraft (Boeing is the subject of multiple U.S trademark registrations of The Boeing Company).

BACKGROUND

Typical bearings include an inner member, for example a ball, surrounded by an outer member. A typical roller bearing includes a plurality of rollers disposed between the inner member and the outer member. A typical hourglass bearing includes a plurality of hourglass shaped rollers disposed between the inner member and the outer member. The inner member defines a radially outwardly facing convex bearing surface. The outer member defines a first radially inwardly facing convex bearing surface and a second radially inwardly facing convex bearing surface. Each of the rollers has a concave exterior surface extending between axial end faces and of the roller.

Corrosion is a major cause of bearing failure on aerospace structures. Corrosion can be due to moisture, salt spray, cleaning fluids, etc. There are several ways to prevent corrosion which include plating, such as Cadmium, on standard steel product, and the use of stainless steels. Stainless steels have differing corrosion resistance. Corrosion of the inner member, of the rollers and of the outer member impedes the ability of the bearing to function as intended. For example, a corroded bearing is less efficient than a bearing that has not undergone corrosion due to increased friction between contact surfaces as a result of said corrosion.

Bearings are typically used in aircraft wing flap arrangements. For example, U.S. Pat. No. 8,714,493 describes a trailing edge flap arrangement for an aircraft wing that includes a drop linkage arrangement that includes one or more bearings. The subject matter of U.S. Pat. No. 8,714,493 is incorporated by reference herein, in its entirety.

SUMMARY OF THE INVENTION

In one aspect, the present invention resides in an hourglass bearing assembly. The hourglass bearing assembly has an inner raceway, an outer raceway, and a plurality of rollers. The inner raceway defines a radially outwardly facing convex surface that has an inner raceway radius of curvature. The outer raceway defines a radially inward facing convex inner surface that has an outer raceway radius of curvature. The outer raceway is positioned around the inner raceway. The plurality of rollers is disposed between the inner raceway and the outer raceway. Each roller of the plurality of rollers has an hourglass shape and is in rolling engagement with the inner raceway and the outer raceway. In one embodiment, each of the plurality of rollers, the inner raceway, and/or the outer raceway include CREN, CRES, Cronidur 30, XS15NW, 440C stainless steel, and/or 422 stainless steel. In one embodiment, the hourglass bearing is configured for use in a Boeing® aircraft, such as, for example, an Airbus A-350 aircraft.

In another aspect, the present invention resides in a bearing assembly that includes an inner raceway and an outer raceway. The inner raceway is disposed at least partially in the outer raceway. In one embodiment, the outer raceway is fabricated from CREN, CRES, Cronidur 30, XD 15NW, 440C stainless steel, and/or 422 stainless steel. In one embodiment, the inner raceway is fabricated from CREN, CRES, Cronidur 30, XD 15NW, 440C stainless steel, and/or 422 stainless steel. In one embodiment, a plurality of rollers is disposed between the inner raceway and the outer raceway. In one embodiment, the plurality of rollers is fabricated from CREN, CRES, Cronidur 30, XD 15NW, 440C stainless steel, and/or 422 stainless steel. In one embodiment, each the inner raceway and the outer raceway are fabricated from CREN, CRES, Cronidur 30, XD 15NW, 440C stainless steel, and/or 422 stainless steel. In one embodiment, each the inner raceway and the plurality of rollers are fabricated from CREN, CRES, Cronidur 30, XD 15NW, 440C stainless steel, and/or 422 stainless steel. In one embodiment, each the outer raceway and the plurality of rollers are fabricated from CREN, CRES, Cronidur 30, XD 15NW, 440C stainless steel, and/or 422 stainless steel. In one embodiment, each the inner raceway, the outer raceway, and the plurality of rollers are fabricated from CREN, CRES, Cronidur 30, XD 15NW, 440C stainless steel, and/or 422 stainless steel.

In another aspect, the present invention resides in an edge flap arrangement for an aircraft wing. The edge flap arrangement includes a main flap element and an actuator for moving the main flap element relative to the wing and a linkage arrangement that supports the main flap element from the aircraft wing for movement relative to the wing. The linkage arrangement includes a fixed strut secured to the aircraft wing and a drop link secured to the main flap. The fixed strut and the drop link are pivotally connected by a hinge point. The hinge point includes one or more first hourglass bearing assemblies. The first hourglass bearing assemblies each include an inner raceway that defines a radially outwardly facing convex surface. The radially outward facing convex surface has an inner raceway radius of curvature. The first bearing assembly further includes an outer raceway that defines a radially inward facing convex inner surface. The radially inward facing convex inner surface has an outer raceway radius of curvature. The outer raceway is positioned around the inner raceway. The first bearing assembly further includes a first plurality of rollers disposed between the inner raceway and the outer raceway. Each of the plurality of first rollers has an hourglass shape and is in rolling engagement with the inner raceway and the outer raceway.

In one embodiment, the edge flap arrangement further includes a second hourglass bearing assembly installed in the actuator for moving the main flap element relative to the aircraft wing. The second hourglass bearing assembly includes an inner raceway that defines a radially outwardly facing convex surface. The radially outward facing convex surface has an inner raceway radius of curvature. The second bearing assembly further includes an outer raceway that defines a radially inward facing convex inner surface. The radially inward facing convex inner surface has an outer raceway radius of curvature. The outer raceway is positioned around the inner raceway. The second bearing assembly further includes a first plurality of rollers disposed between the inner raceway and the outer raceway. Each of the plurality of first rollers has an hourglass shape and is in rolling engagement with the inner raceway and the outer raceway. In one embodiment, each of the plurality of rollers, the inner raceway, and the outer raceway include CREN, CRES, Cronidur 30, XD 15NW, 440C stainless steel, and/or 422 stainless steel. In one embodiment, the hourglass bearing is configured for use in a Boeing® aircraft, such as, for example, an Airbus A-350 aircraft.

DETAILED DESCRIPTION OF THE INVENTION

Figure 1:
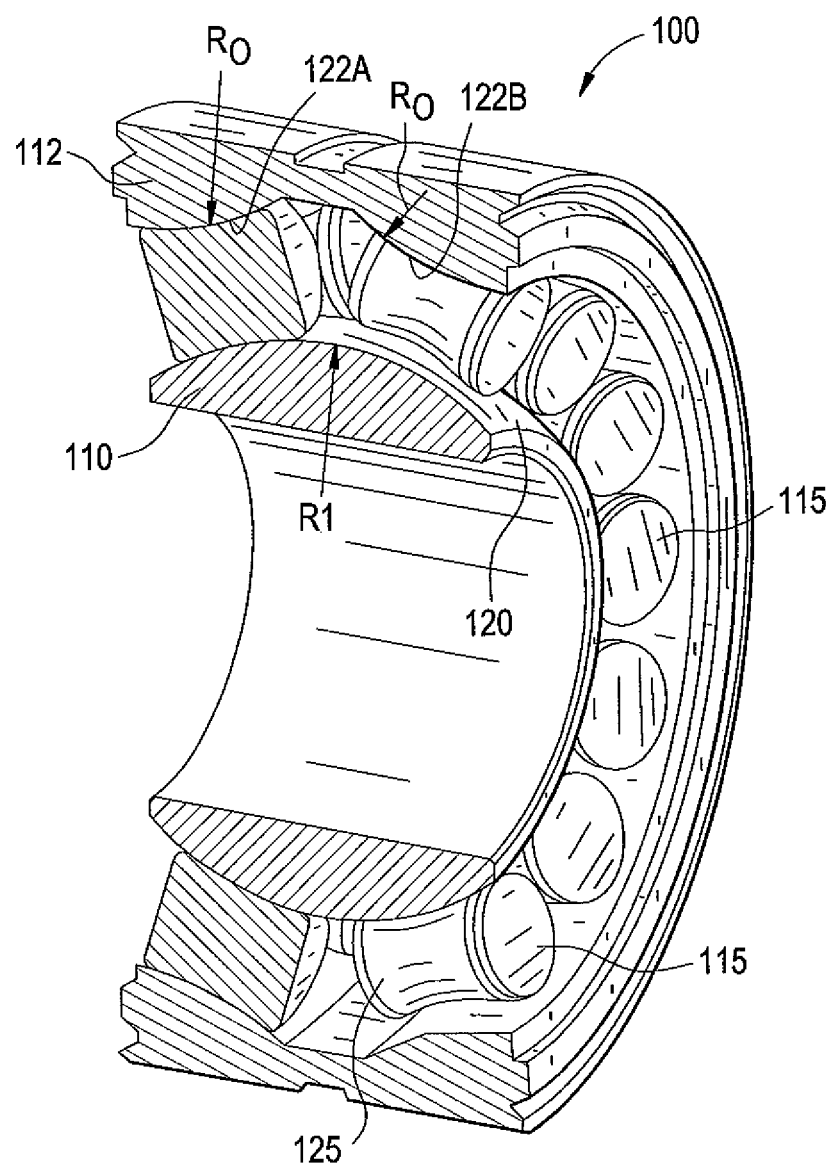
FIG. 1 is a perspective view of a cross section of an hourglass bearing of the present invention.

As shown in FIG. 1, an hourglass bearing assembly is generally designated by the numeral 100. The hourglass bearing assembly 100 includes an inner raceway 110 defining a radially outwardly facing convex surface 120 having a radius of curvature R1. The hourglass bearing assembly 100 includes an outer raceway 112 defining a radially inward facing convex inner surface 122A and 122B, each having an outer raceway radius of curvature Ro. The outer raceway 112 is positioned around the inner raceway 110. A plurality of rollers 115 is disposed between the inner raceway 110 and the outer raceway 112 in two rows. Each of the plurality of rollers 115 has an hourglass shape. Each of the plurality of rollers 115 in one row is in rolling engagement with the radially outwardly facing convex surface 120 of the inner raceway 110 and the radially inward facing convex inner surface 122A of the outer raceway 112. Each of the plurality of rollers 115 in a second row is in rolling engagement with the radially outwardly facing convex surface 120 of the inner raceway 110 and the radially inward facing convex inner surface 122B of the outer raceway 112. While an hourglass bearing is shown and described, the present invention is not limited in this regard, as any suitable type of bearing, including but not limited to journal bearings, roller bearings, and spherical plain bearings may be employed and are considered within the scope of the present invention.

Figure 2:
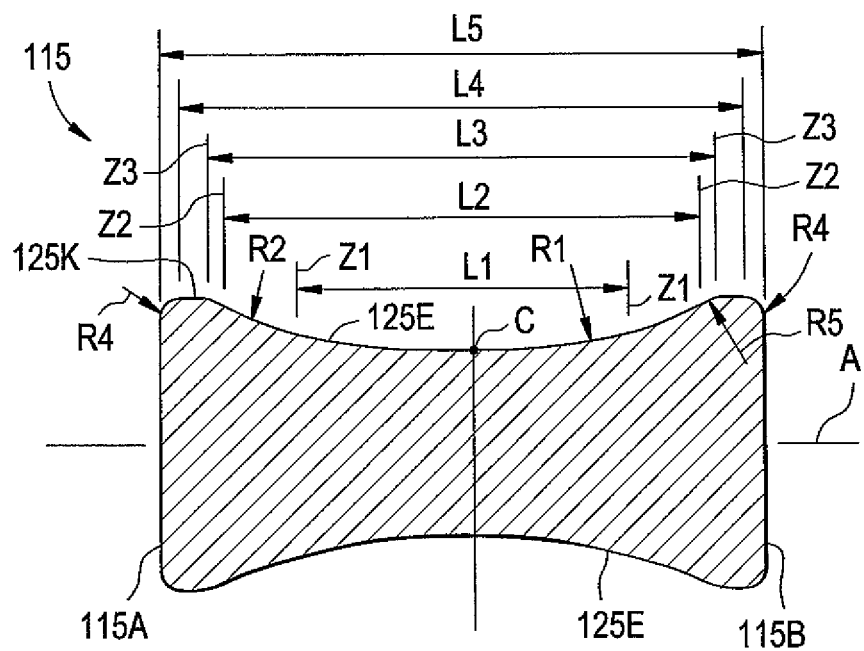
FIG. 2 is a cross sectional view of one of the rollers of the hourglass bearing of FIG. 1.

As shown in FIG. 2, each of the plurality of rollers 115 has a circular cross section symmetrical about a longitudinal axis A. Each of the plurality of rollers 115 has a first axial end 115A and a second axial end 115B and an overall length of L5. A chamfer R4 exists at each of the first axial end 115A and second axial end 115B. Each of the plurality of rollers 115 has an exterior surface 125E extending between the first axial end 115A and the second axial end 115B. A portion of the exterior surface 125E between length L4 and L3 is cylindrical. The exterior surface 125E defines a concave engagement surface 125E extending outwardly from a central portion C of the roller 115. The concave engagement surface 125E has a first radius of curvature R1 extending from the central portion C to each of two first transition zones Z1 positioned on opposing sides of the central portion C. The two first transition zones Z1 are spaced apart from one another by a distance L1. The concave engagement surface 125E has a second radius of curvature R2 extending outwardly from each of the two first transition zones Z1 to each of two second transition zones Z2. The two second transition zones Z2 are spaced part from one another by a distance L2.

As shown in FIG. 2, the second radius of curvature R2 is greater than the first radius of curvature R1. In one embodiment, the first radius of curvature R1 is between 50 percent and 95 percent of the second radius of curvature R2. In one embodiment, the first radius of curvature R1 is between 70 percent and 92 percent of the second radius of curvature R2.

In one embodiment, the rollers 115 are manufactured from CREN material. In one embodiment, CREN material for the rollers 115 is manufactured from Cronidur 30®. In one embodiment, CREN material for the rollers 115 is manufactured from XD15NW®. In one embodiment, the rollers 115 are manufactured from 422 stainless steel.

In one embodiment, the inner raceway 110 is manufactured from CREN material. In one embodiment, CREN material for the inner raceway 110 is manufactured from Cronidur 30®. In one embodiment, CREN material for the inner raceway 110 is manufactured from XD15NW®. In one embodiment, the inner raceway 110 is manufactured from 422 stainless steel.

In one embodiment, the outer raceway 112 is manufactured from CREN material. In one embodiment, CREN material for the outer raceway 112 is manufactured from Cronidur 30®. In one embodiment, CREN material for the outer raceway 112 is manufactured from XD15NW®. In one embodiment, the outer raceway 112 is manufactured from 422 stainless steel.

XD15NW® includes between 0.37 and 0.45 percent by weight carbon, up to 0.60 percent by weight silicon, up to 0.60 percent by weight manganese, between 15.00 and 16.5 percent by weight chromium, between 1.50 and 1.90 percent by weight molybdenum, between 0.20 and 0.40 percent by weight vanadium, between 0.16 and 0.25 percent by weight nitrogen and up to 0.30 percent by weight nickel.

Cronidur 30® includes between 0.25 and 0.35 percent by weight carbon, up to 1.00 percent by weight silicon, up to 1.00 percent by weight manganese, between 14.00 and 16.00 percent by weight chromium, up to 0.50 percent by weight nickel, between 0.85 and 1.10 percent by weight molybdenum and between 0.30 and 0.50 percent by weight nitrogen.

In one embodiment, the rollers 115 are manufactured from CRES material. In one embodiment, the CRES material for the rollers 115 is manufactured from 440C stainless steel.

The 440C stainless steel includes between 0.95 to 1.20 percent by weight carbon, up to 1.0 percent by weight silicon, up to 1.0 percent by weight manganese, 16.0 to 18.0 percent by weight chromium, 0.40 to 0.65 percent by weight molybdenum, up to 0.04 weight percent phosphorous, up to 0.75 weight percent nickel, up to 0.75 weight percent copper and up to 0.03 weight percent sulfur.

Figure 3:
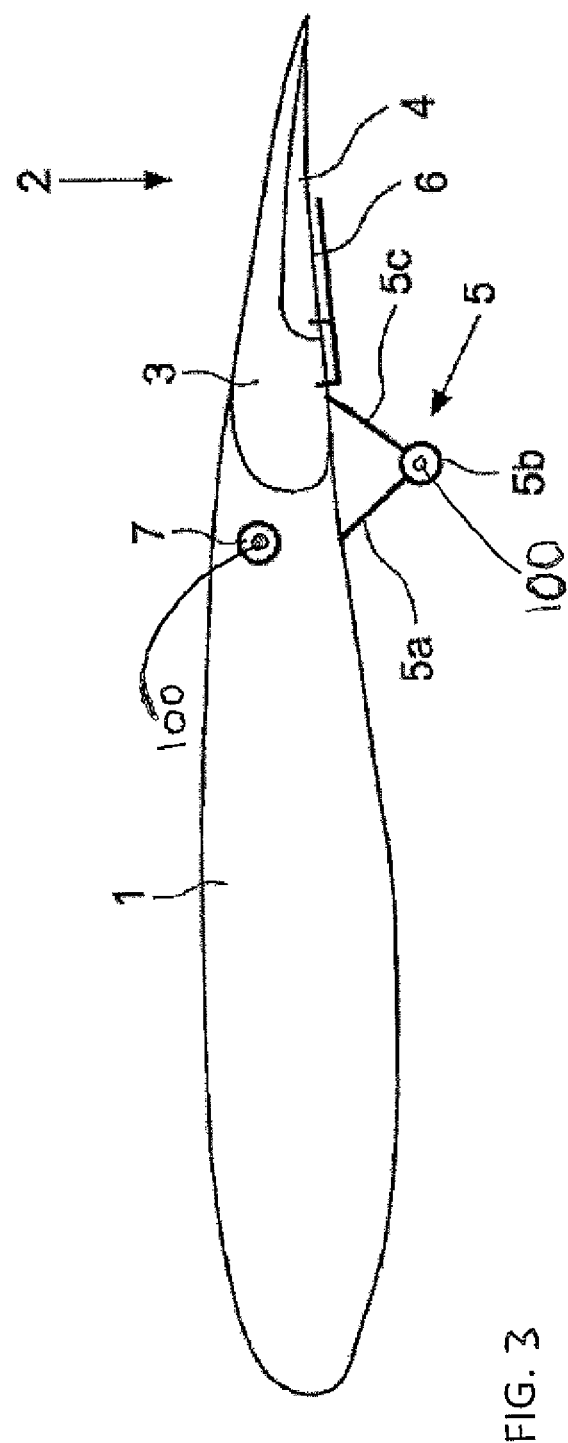
FIG. 3 is a perspective view of an edge flap of the present invention.

Referring to FIG. 3, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement includes a fixed strut 5A, a hinge point 5B and a drop link 5C. The fixed strut 5A is mounted to the fixed wing portion 1 and carries the hinge point 5B. The drop link 5c connects the main flap element 3 to the hinge point 5B. The auxiliary flap element 4 is supported by a rail 6 mounted to the main flap element 3. The auxiliary flap element 4 is slidably disposed upon the rail 6 for translational movement relative to the main flap element 3. The hinge point 5B has one of the bearing assemblies 100 mounted therein. In one embodiment, the bearing assembly 100 includes the inner raceway 110, outer raceway 112 and/or rollers 115 manufactured from CREN, for example XD15NW® or Cronidur 30®. In one embodiment, the bearing assembly 100 includes the inner raceway 110, outer raceway 112 and/or rollers 115 manufactured from CRES, for example 440C stainless steel. While the hinge point 5B is described as having one of the bearings 100 therein, the present invention is not limited in this regard as any number of the bearings 100 may be employed in the hinge point 5B. In one embodiment, the hinge point 5B has two of the bearings 100 installed therein; and in another embodiment, the hinge point 5B has two of the bearings 100 installed therein wherein the bearings 100 comprise different sized bearings. While the inner raceway 110, the outer raceway 112, and/or the rollers 115 are described herein as being manufactured from CREN, the present invention is not limited in this regard, as one or more of the inner raceway 110, the outer raceway 112, and/or the rollers 115 may be manufactured from CREN or CRES.

FIG. 3 shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element is in its retracted, stowed position. As further shown in FIG. 3, the main flap element 3 includes an actuator 7 (e.g., a linear or a rotary actuator), which is connected by a linkage arrangement (not shown) to the main flap element 3. In one embodiment, the actuator 7 has one of the bearings 100 (as described herein with reference to FIGS. 1-2) disposed therein. While the actuator 7 is described as having one of the bearings 100 therein, the present invention is not limited in this regard as any number of the bearings 100 may be employed in the actuator 7. For example, two bearings 100 are employed in a linear actuator. The actuator 7 provides for movement of the main flap element 3 relative to the fixed wing portion 1.

In one embodiment, the actuator 7 provides for movement of the drop hinge linkage arrangement 5 which, in turn, provides for movement of the main flap element 3 relative to the fixed wing portion 1.

Figure 4:
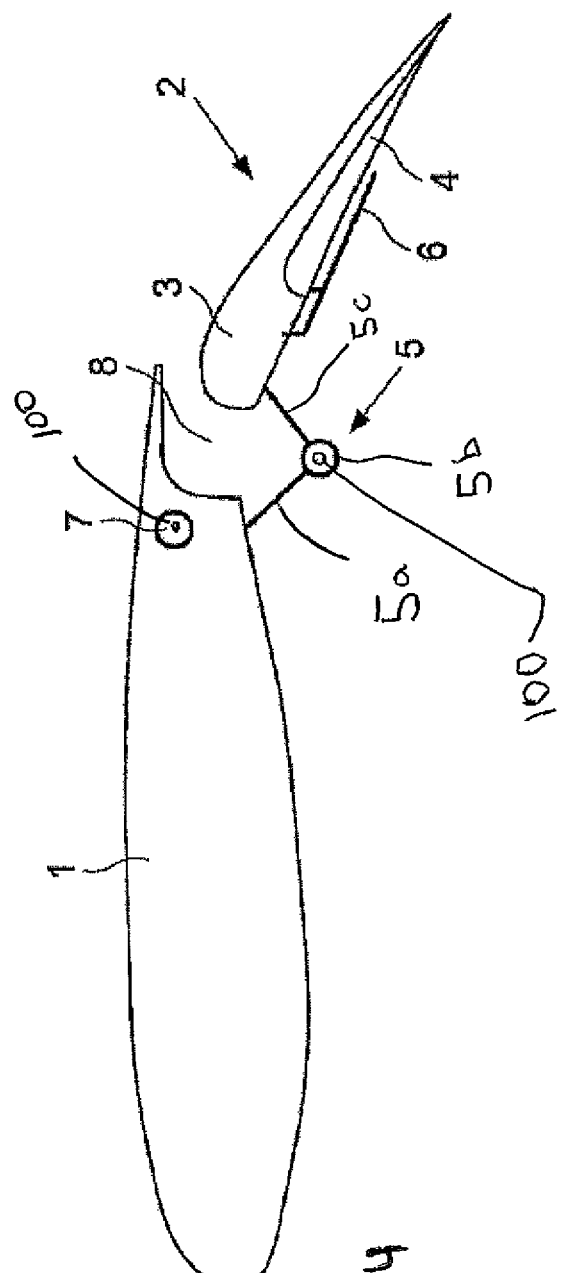
FIG. 4 is a perspective view of the edge flap of FIG. 3, wherein the edge flap is in a partially extended position.

FIG. 4 illustrates the flap arrangement 2 in its partially extended position. The main flap element 3 is deployed by rotating the main flap element 3 downwardly using the drop hinge mechanism 5. Movement of the main flap element 3 is affected by rotary actuator 7 and the bearing 100 installed therein. The auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 4 enables high pressure air from the lower wing surface to pass through the slot 8 to energize the boundary layer over the upper surface of the main flap element 3 so as to postpone stall in a conventional manner. The single slotted trailing edge flap arrangement 2 is configured for use with other than Boeing® aircraft such as, for example, an Airbus A-350 aircraft.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. An edge flap arrangement for an aircraft wing, the arrangement comprising:
   a main flap element and an actuator for moving the main flap element relative to the wing;
   a linkage arrangement supporting the main flap element from the aircraft wing for movement relative to the wing, the linkage arrangement including a fixed strut secured to the aircraft wing and a drop link secured to the main flap, the fixed strut and the drop link being pivotally connected by a hinge point;
   the hinge point comprising at least a first hourglass bearing assembly, the first hourglass bearing assembly comprising:
      an inner raceway defining a radially outwardly facing convex surface having an inner raceway radius of curvature Ri;
      an outer raceway defining a radially inward facing convex inner surface having an outer raceway radius of curvature Ro, the outer raceway being positioned around the inner raceway; and
      a plurality of rollers disposed between the inner raceway and the outer raceway, each of the plurality of first rollers having an hourglass shape and being in rolling engagement with the inner raceway and the outer raceway.

2. The edge flap arrangement of claim 1, further comprising:
   at least a second hourglass bearing assembly installed in the actuator for moving the main flap element relative to the aircraft wing, the at least one second hourglass bearing assembly comprising:
      an inner raceway defining a radially outwardly facing convex surface having an inner raceway radius of curvature Ri;

an outer raceway defining a radially inward facing convex inner surface having an outer raceway radius of curvature Ro, the outer raceway being positioned around the inner raceway; and a plurality of second rollers disposed between the inner raceway and the outer raceway, each of the plurality of rollers having an hourglass shape and being in rolling engagement with the inner raceway and the outer raceway.

3. The edge flap arrangement of claim 1 wherein the hinge point comprises a plurality of first bearings.

4. The edge flap arrangement of claim 2 wherein the actuator comprises a plurality of second bearings.

5. The edge flap arrangement of claim 1, wherein each of the plurality of rollers comprises CRES.

6. The edge flap arrangement of claim 5, wherein each of the plurality of rollers comprises 440C stainless steel.

7. The edge flap arrangement of claim 1, wherein the inner raceway comprises CRES.

8. The edge flap arrangement of claim 7, wherein the inner raceway comprises 440C stainless steel.

9. The edge flap arrangement of claim 1, wherein the outer raceway comprises CRES.

10. The edge flap arrangement of claim 9, wherein the outer raceway comprises 440C stainless steel.

11. The edge flap arrangement of claim 1 configured for use with other than Boeing® aircraft.

12. The edge flap arrangement of claim 1 configured for use with an Airbus A-350 aircraft.

13. The edge flap arrangement of claim 2, wherein each of the plurality of first and second rollers comprises CREN.

14. The edge flap arrangement of claim 2, wherein each of the plurality of first and second rollers comprises AMS 5925.

15. The edge flap arrangement of claim 2, wherein each of the plurality of first and second rollers comprises AMS 5920.

16. The edge flap arrangement of claim 1, wherein the inner raceway comprises CREN.

17. The edge flap arrangement of claim 1, wherein the inner raceway comprises AMS 5925.

18. The edge flap arrangement of claim 1, wherein the inner raceway comprises AMS 5920.

19. The edge flap arrangement of claim 1, wherein the outer raceway comprises CREN.

20. The edge flap arrangement of claim 1, wherein the outer raceway comprises AMS 5925.

21. The edge flap arrangement of claim 1, wherein the outer raceway comprises AMS 5920.

22. The edge flap arrangement of claim 2, wherein each of the plurality of first and second rollers comprises 422 stainless steel.

23. The edge flap arrangement of claim 1, wherein the inner raceway comprises 422 stainless steel.

24. The edge flap arrangement of claim 1, wherein the outer raceway comprises 422 stainless steel.

* * * * *